United States Patent
Urata et al.

(10) Patent No.: US 12,043,014 B2
(45) Date of Patent: Jul. 23, 2024

(54) WINDOW GLASS FOR VEHICLE

(71) Applicant: AGC Inc., Tokyo (JP)

(72) Inventors: Ryoichi Urata, Tokyo (JP); Satoshi Otsuki, Tokyo (JP); Miki Kuroda, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 17/872,798

(22) Filed: Jul. 25, 2022

(65) Prior Publication Data
US 2023/0032295 A1 Feb. 2, 2023

(30) Foreign Application Priority Data

Jul. 28, 2021 (JP) ................. 2021-123705

(51) Int. Cl.
*B32B 3/08* (2006.01)
*B32B 7/12* (2006.01)
(Continued)

(52) U.S. Cl.
CPC ............ *B32B 3/08* (2013.01); *B32B 7/12* (2013.01); *B32B 17/10* (2013.01); *B32B 27/36* (2013.01); *B60J 1/001* (2013.01); *B60R 11/04* (2013.01); *B32B 17/10761* (2013.01); *B32B 17/10788* (2013.01); *B32B 2255/20* (2013.01);
(Continued)

(58) Field of Classification Search
CPC .. B32B 3/08; B32B 7/12; B32B 17/10; B32B 27/36; B32B 17/10761; B32B 17/10788; B32B 2255/20; B32B 2307/402; B32B 2307/412; B32B 2605/00; B60J 1/001; B60R 11/04; B60R 2011/0026
See application file for complete search history.

(56) References Cited

U.S. PATENT DOCUMENTS

| 2007/0216768 A1* | 9/2007 | Smith .................. B60J 1/02 348/118 |
| 2019/0061482 A1 | 2/2019 | Kikuchi et al. |
(Continued)

FOREIGN PATENT DOCUMENTS

| JP | 2015024929 A * | 2/2015 |
| WO | WO-2017/188412 A1 | 11/2017 |
| WO | WO-2017/188414 A1 | 11/2017 |

OTHER PUBLICATIONS

Espacenet machine translation to English of JP2015-024929A retrieved Sep. 30, 2023 (Year: 2023).*

*Primary Examiner* — Alicia J Weydemeyer
*Assistant Examiner* — Laura B Figg
(74) *Attorney, Agent, or Firm* — Foley & Lardner LLP (57) ABSTRACT

An object of the present disclosure is to provide a window glass for vehicle that prevents intensity of light to be used in optical equipment attached to a vehicle from being attenuated, and that is easier to handle while having a component unit. A window glass for vehicle comprises: a laminated glass including a vehicle inner glass plate, a vehicle outer glass plate and an interlayer film; and a component unit. A vehicle inner glass plate is cut-out at a portion of the periphery of the laminated glass, and in the portion, the component unit is arranged. A vehicle inner surface of the laminated glass fits on the flush with a vehicle inner surface of the component unit, at least in a region, on a boundary between the laminated glass and the component unit.

6 Claims, 5 Drawing Sheets

(51) Int. Cl.
    *B32B 17/10*    (2006.01)
    *B32B 27/36*    (2006.01)
    *B60J 1/00*    (2006.01)
    *B60R 11/00*    (2006.01)
    *B60R 11/04*    (2006.01)

(52) U.S. Cl.
    CPC ... *B32B 2307/402* (2013.01); *B32B 2307/412* (2013.01); *B32B 2605/00* (2013.01); *B60R 2011/0026* (2013.01)

(56) References Cited

U.S. PATENT DOCUMENTS

2019/0061641 A1\* 2/2019 Kikuchi ..................... B60J 1/00
2021/0060906 A1 3/2021 Black et al.

\* cited by examiner

WINDOW GLASS FOR VEHICLE

INCORPORATION BY REFERENCE

This application is based upon and claims the benefit of priority from Japanese patent application No. 2021-123705, filed on Jul. 28, 2021, the disclosure of which is incorporated herein in its entirety by reference.

BACKGROUND

The present disclosure relates to a window glass for vehicle, and particularly to a window glass for vehicle including a component unit to be used for attaching vehicle components.

In recent years, optical equipment such as FIR (Far Infrared Rays) cameras, LiDAR (Light Detection And Ranging), radars, and optical sensors for acquiring information around vehicles are increasingly mounted on inner surfaces of window glasses for vehicle such as vehicle windshields, for the purpose of driving support. Then, component units for mounting the optical equipment on window glasses for vehicle are being developed.

However, window glasses for vehicle are usually laminated glass each made by combining two glass plates, which makes a problem in which intensity of near-infrared rays, far-infrared rays, etc. to be used in FIR cameras, LiDAR, etc. is attenuated by the glass. So, there is an idea to change the two pieces of glass to glass that easily transmits infrared rays. However, if the two pieces of glass are changed to glass that easily transmits infrared rays, there is a problem in which the inside of the vehicle becomes too hot. US Patent Application Publication No. 2021/0060906 describes that: a cut-out portion is provided which is a portion of two pieces of laminated glass cut-out from at least a part of one edge toward the center thereof to install optical equipment; and the cut-out portion is provided with an IR lens (Infrared lens).

SUMMARY

However, according to US Patent Application Publication No. 2021/0060906, the IR lens is attached to the cut-out portion of the laminated glass using a subframe. This creates a step on the vehicle outer surface and the vehicle inner surface of the window glass for vehicle at the joint between the subframe and the window glass for vehicle. This makes a problem in which the step lowers workability in applying urethane sealant to the vehicle inner surface of the window glass for vehicle so as to cover the entire periphery of the window glass for vehicle, for example, to attach the window glass for vehicle to the vehicle. In other words, the window glass for vehicle is likely to be difficult to handle.

In view of the above problems, an object of the present disclosure is to provide a window glass for vehicle that prevents intensity of light to be used in optical equipment attached to a vehicle from being attenuated, and that is easier to handle while having a component unit.

A window glass for vehicle according to an aspect of the present disclosure includes: a laminated glass including two glass plates bonded via an interlayer film; and a component unit capable of attaching vehicle components, including at least optical equipment, to a portion of a periphery of the laminated glass, wherein: at least a vehicle inner glass plate, located on a vehicle inner side when the laminated glass is attached to a vehicle, is cut-out at a portion of the periphery of the laminated glass, the portion being a portion in which the component unit is arranged; and the component unit has a shape at least in a region, the shape being a shape such that a vehicle inner surface of the laminated glass fits on the flush with a vehicle inner surface of the component unit, the region being a boundary between the laminated glass and the component unit, the region being a region where an adhesive is applied for attaching the window glass for vehicle to the vehicle.

In the above-mentioned window glass for vehicle, the component unit may have a shape in a region, the shape being a shape such that a vehicle inner surface and a vehicle outer surface of the window glass for vehicle have no step, the region being a periphery of the window glass for vehicle, the region contributing to attaching the window glass for vehicle to the vehicle.

In the above-mentioned window glass for vehicle, the component unit may be capable of attaching the optical equipment to a wiper wiping region of the window glass for vehicle.

In the above-mentioned window glass for vehicle, a configuration may be such that: the vehicle inner glass plate of the laminated glass is cut-out at a portion of the periphery of the laminated glass, the portion being a portion in which the component unit is arranged; the component unit includes a plate-shaped member adhered to a vehicle inner surface of a vehicle outer glass plate located on a vehicle outer side of the laminated glass; and the plate-shaped member has an area covering a portion in which the vehicle inner glass plate of the laminated glass is cut-out.

In the above-mentioned window glass for vehicle, a configuration may be such that: the vehicle inner glass plate and the vehicle outer glass plate of the laminated glass are both cut-out at a portion of the periphery of the laminated glass, the portion being a portion in which the component unit is arranged; the component unit includes a plate-shaped member that can fit into the portion of the laminated glass that is cut-out; and the plate-shaped member has a shape such that a vehicle outer surface of the laminated glass fits on the flush with a vehicle outer surface of the plate-shaped member at a boundary between the laminated glass and the plate-shaped member.

In the above-mentioned window glass for vehicle, a configuration may be such that: the plate-shaped member is strengthened glass that can transmit infrared rays; the component unit includes a reinforcing plate for backing a vehicle inner surface of the strengthened glass and a vehicle inner surface of the laminated glass at a boundary between the strengthened glass and the laminated glass; and the strengthened glass, the laminated glass, and the reinforcing plate are joined with an adhesive.

In the above-mentioned window glass for vehicle, the component unit may further include a shielding layer formed at a portion on a vehicle inner surface of the strengthened glass, the portion excluding at least a portion corresponding to an optical path of the optical equipment.

In the above-mentioned window glass for vehicle, a configuration may be such that: the plate-shaped member is formed using resin; and at least a portion of the plate-shaped member is made of resin capable of transmitting infrared rays, the portion corresponding to an optical path of the optical equipment.

In the above-mentioned window glass for vehicle, a portion of the plate-shaped member may be made of colored resin, the portion being other than the portion made of resin capable of transmitting infrared rays.

In the above-mentioned window glass for vehicle, a portion of the plate-shaped member may be made of metal, the portion being other than the portion made of resin capable of transmitting infrared rays.

In the above-mentioned window glass for vehicle, the portion made of resin capable of transmitting infrared rays may have a shape at a boundary with the portion made of metal, the shape being such that a vehicle outer surface of the portion made of resin capable of transmitting infrared rays fits on the flush with a vehicle outer surface of the portion made of metal.

The present disclosure makes it possible to provide a window glass for vehicle that prevents intensity of light to be used in optical equipment attached to the vehicle from being attenuated, and that is easier to handle while having a component unit.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

The following describes embodiments of the present disclosure with reference to the drawings.

In the present specification, "substantially" modifying a shape means a partially changed shape such as a chamfered shape in which corners of the shape is rounded, a shape in which a part of the shape is missing, and a shape in which a small shape is added to the shape.

In the present specification, unless otherwise stated, "up and down", "left and right", and "vertical and horizontal" are "up-down", "left-right", and "vertical-horizontal" as seen from a passenger of a vehicle to which a window glass for vehicle is attached.

First Embodiment

Figure 1:
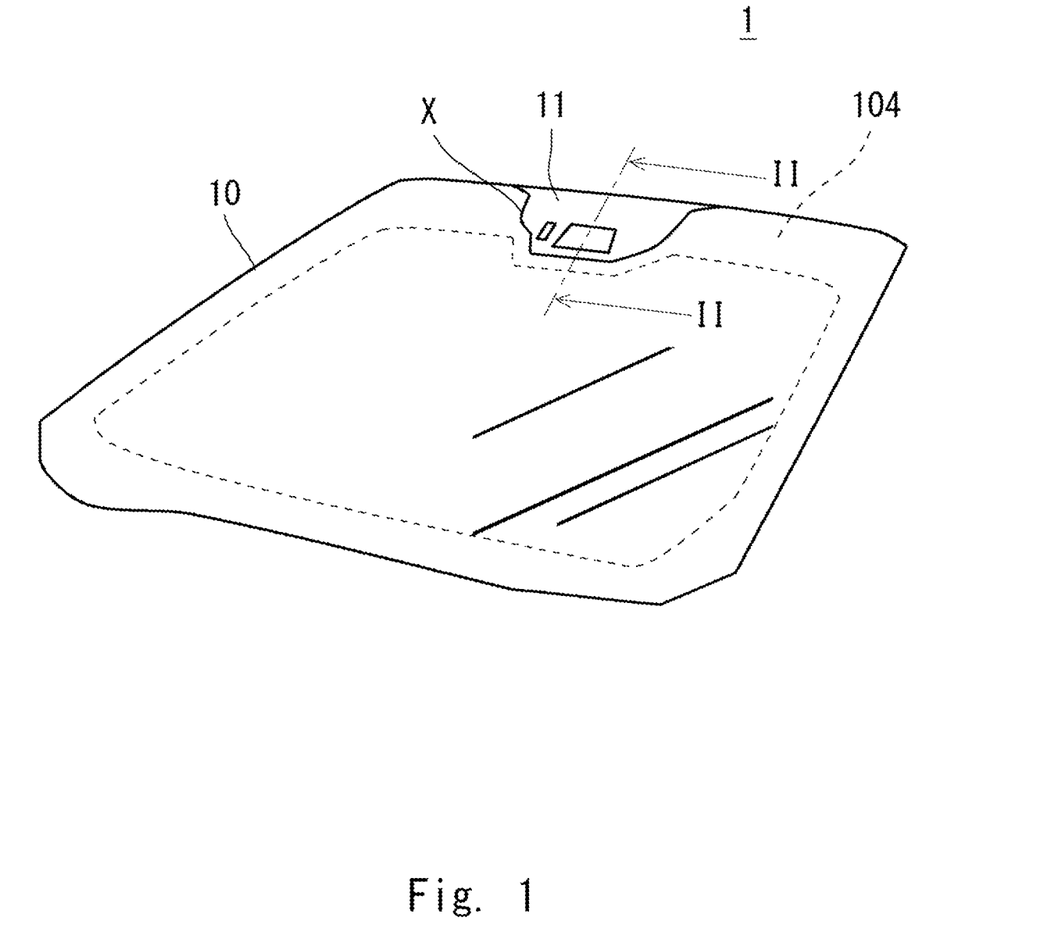
FIG. 1 is a perspective view for explaining a window glass for vehicle according to a first embodiment.
Figure 2:
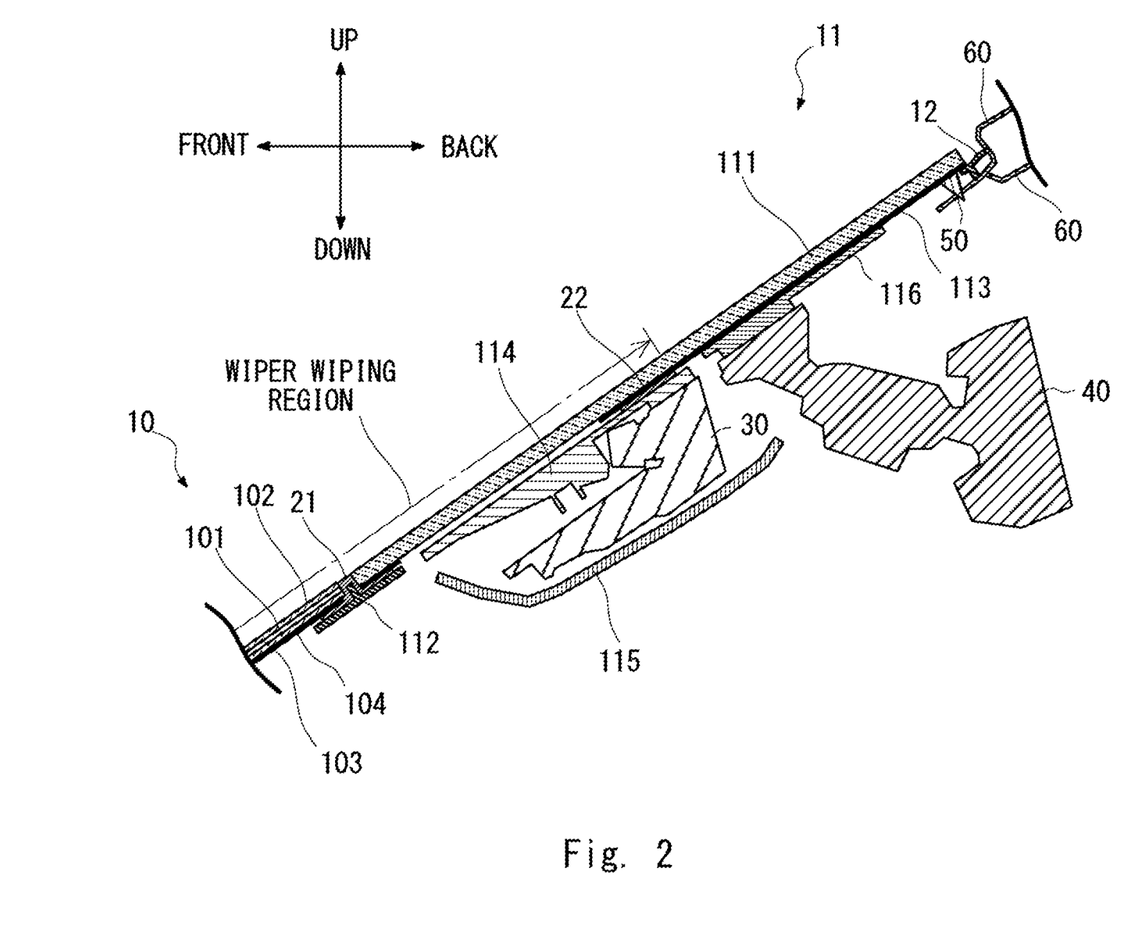
FIG. 2 is a cross-sectional view for explaining the window glass for vehicle according to the first embodiment.

FIG. 1 is a perspective view for explaining a window glass for vehicle 1 according to a first embodiment. FIG. 2 corresponds to a cross-sectional view of a window glass for vehicle 1 cut along a cutting line II-II of FIG. 1, and is a cross-sectional view seen from the left side of a vehicle. The window glass for vehicle 1 according to the present embodiment may have a shape suitable for mounting on the vehicle, and it is formed in a substantially trapezoidal shape in a plan view in an example shown in FIG. 1. Note that the shape of the window glass for vehicle 1 shown in FIG. 1 is an example, and in the present embodiment, it may have a shape other than the window glass for vehicle shown in FIG. 1. Further, the window glass for vehicle 1 includes a laminated glass 10 and a component unit 11 for attaching vehicle components including optical equipment to a portion of a periphery of the laminated glass 10.

Further, as shown in FIG. 2, the window glass for vehicle 1 may include a mold 12 made of resin on the outermost peripheral side of the periphery of the window glass for vehicle 1.

As an example, the mold 12 made of resin is attached to the upper edge of the window glass for vehicle 1 with a known double-sided tape or an adhesive. Examples of the material of the mold 12 include synthetic resins such as olefin-based thermoplastic elastomer (TPO), polyvinyl chloride (PVC), and thermoplastic elastomer (TPE).

As shown in FIG. 2, when the window glass for vehicle 1 is attached to a vehicle body panel 60, urethane sealant 50 as an adhesive is applied to the vehicle inner surface of the periphery of the window glass for vehicle 1. Specifically, the urethane sealant 50 is applied at a position inside the mold 12 on the vehicle inner surface of the window glass for vehicle 1 so as to cover the entire periphery of the window glass for vehicle 1. Then, the window glass for vehicle 1 and the metal body panel 60 are adhered to each other via the urethane sealant 50. At that time, the mold 12 comes into contact with the body panel 60. The mold 12 prevents the urethane sealant 50 from being visually recognized from the outside of the vehicle. This makes it possible to improve the design of the window glass for vehicle 1 and the vehicle to which the window glass for vehicle 1 is attached. Further, if there is a gap between the window glass for vehicle 1 and the body panel 60, wind and rain may enter through the gap during driving, but the mold 12 and the urethane sealant 50 can prevent the wind and rain from entering the vehicle. Note that a primer for glass may be applied between the window glass for vehicle 1 and the urethane sealant 50, to promote the adhesion between the window glass for vehicle 1 and the urethane sealant 50. Alternatively, a primer for painted surface or a primer for resin may be applied between the body panel 60 and the urethane sealant 50, to promote adhesion between the body panel 60 and the urethane sealant 50.

As shown in FIG. 2, the laminated glass 10 is formed by bonding two glass plates 101 and 102. Specifically, the laminated glass 10 is formed by bonding a vehicle inner glass plate 101 and a vehicle outer glass plate 102 to each other via an interlayer film 103. The vehicle inner glass plate 101 is located inside the vehicle and the vehicle outer glass plate 102 is located outside the vehicle when attached to the vehicle. Further, the laminated glass 10 may include a shielding layer on at least one of the periphery of the vehicle inner surface of the vehicle inner glass plate 101 and the periphery of the vehicle inner surface of the vehicle outer glass plate 102. In the example shown in FIG. 1, the shielding layer 104 is formed on the periphery of the vehicle inner surface of the vehicle inner glass plate 101.

The glass plates 101 and 102 may be inorganic glass or organic glass. Examples of the inorganic glass include soda lime glass, aluminosilicate glass, borosilicate glass, non-alkali glass, and quartz glass, which are used without particular limitation. Among these, soda lime glass is particularly preferable from the viewpoint of manufacturing cost and formability. The forming method of the glass plates 101 and 102 is not particularly limited. For example, the inorganic glass is preferably a glass plate formed by a float method or the like.

When the glass plates 101 and 102 are inorganic glass, the glass plates 101 and 102 may be any of unstrengthened glass and strengthened glass. Unstrengthened glass is made by forming molten glass into a plate shape and slowly cooling it. Strengthened glass has a compressive stress layer formed on the surface of the unstrengthened glass, and may be any of air-cooled/tempered glass or chemically strengthened glass.

When the strengthened glass is physically strengthened glass (e.g., air-cooled/tempered glass), operations other than slow cooling may be used to generate a compressive stress layer on the glass surface due to the temperature difference between the glass surface and the inside of the glass, to strengthen the glass surface. Examples of such operations includes an operation in which the glass plate that has been uniformly heated in bending is rapidly cooled from a temperature near the softening point. When the strengthened glass is chemically strengthened glass, an ion exchange method or the like may be used after bending, to generate a compressive stress on the glass surface to strengthen the glass surface. Further, the glass plates 101 and 102 to be used may be glass that absorbs ultraviolet rays or infrared rays. The glass plates 101 and 102 are preferably transparent, but may be colored glass plates to an extent that the transparency is not impaired.

The laminated glass 10 may have a curved shape such that the vehicle outer side becomes convex when attached to the vehicle. The laminated glass 10 may have a single bent shape that is bent in only one direction. Alternatively, the laminated glass 10 may have a compound bent shape bent in two directions (for example, the up-down direction when the laminated glass 10 is attached to the vehicle, and the left-right direction orthogonal to the up-down direction). Gravity forming, press forming, roller forming, or the like is used for bending of the laminated glass 10. When the laminated glass 10 is bent to a predetermined curvature, the radius of curvature of the laminated glass 10 may be 1000 mm or more and 100,000 mm or less.

An example of the interlayer film 103 of the laminated glass 10 to be used is a known thermoplastic resin film made of polyvinyl butyral (PVB) or ethylene vinyl acetate copolymer resin (EVA). The interlayer film 103 of the laminated glass 10 may be transparent or may be colored. Further, the interlayer film 103 may be structured by two or more layers.

Further, when the laminated glass 10 is attached to the vehicle, the thickness of the vehicle outer glass plate 102 located outside the vehicle and the thickness of the vehicle inner glass plate 101 located inside the vehicle may be the same or different. The thickness of the vehicle outer glass plate 102 is preferably 1.0 mm or more and 3.0 mm or less. When the thickness of the vehicle outer glass plate 102 of the vehicle is 1.0 mm or more, the strength such as stone chip resistance is sufficient. When it is 3.0 mm or less, the mass of the laminated glass 10 does not become too large, which is preferable in terms of fuel efficiency of the vehicle. The thickness of the vehicle inner glass plate 101 is preferably 0.3 mm or more and 2.3 mm or less. When the thickness of the vehicle inner glass plate 101 of the vehicle is 0.3 mm or more, the handling is easy, and when it is 2.3 mm or less, the mass does not become too large. When the thickness of the vehicle outer glass plate 102 and the thickness of the vehicle inner glass plate 101 are 1.8 mm or less, the weight of the laminated glass 10 can be reduced and the sound insulation can be achieved, which is preferable. Note that when the thickness of the vehicle inner glass plate 101 is 1.0 mm or less, the vehicle inner glass plate 101 may be chemically strengthened glass. When the vehicle inner glass plate 101 is chemically strengthened glass, it is preferable that the compressive stress value of the glass surface be 300 MPa or more and the depth of the compressive stress layer be 2 μm or more.

When the glass plates 101 and 102 are organic glass, the material of the organic glass may be a transparent resin such as polycarbonate or acrylic resin (for example, polymethylmethacrylate).

The shielding layer 104 is formed, for example, by applying a ceramic color paste containing a meltable glass frit containing a black pigment and firing the paste. The adhesive or the like applied to the laminated glass 10 can be prevented from being deteriorated by ultraviolet rays. In addition, various suitable films may be formed on the main surface of the laminated glass 10 from the viewpoint of enhancing weather resistance and enhancing functionality such as hydrophilicity and water-repellency.

Further, as shown in FIG. 2, the vehicle inner glass plate 101 and the vehicle outer glass plate 102 of the laminated glass 10 each may have a cut-out portion, where the component unit 11 is arranged, at the periphery of the laminated glass 10. In the example shown in FIG. 2, the laminated glass 10 and the component unit 11 are joined by an adhesive 21. Further, the component unit 11 may have a camera 30, as one of optical equipment, and a mirror base 116 for attaching a mirror 40, as a vehicle component other than the optical equipment, attached to a portion of the periphery of the laminated glass 10.

The adhesive 21 is preferably an adhesive having light resistance and other weather resistance. Using an adhesive having light resistance and other weather resistance for the adhesive 21 can prevent the adhesive 21 from being deteriorated due to ultraviolet rays emitted from the outside of the vehicle. Specifically, the adhesive 21 to be used may be modified silicone and the like, but is not particularly limited thereto.

As shown in FIG. 2, the component unit 11 may include a strengthened glass 111, a reinforcing plate 112, a shielding layer 113, a camera bracket 114, a camera cover 115, and a mirror base 116 as plate-shaped members.

In the example shown in FIG. 2, the strengthened glass 111 has a shape that can fit into the cut-out portion of the laminated glass 10. Further, the strengthened glass 111 may be any strengthened glass that can transmit infrared rays, and the manufacturing method and material thereof are the same as those of the glass plates 101 and 102, so the description thereof is to be omitted. Note that the strengthened glass that can transmit infrared rays means strengthened glass whose transmittance of light having a wavelength of 0.5 μm or more and 1000 μm or less is 50% or more. Using a strengthened glass that can transmit infrared rays for the strengthened glass 111 makes it possible to prevent the intensity of the near-infrared rays and the far-infrared rays used in the camera 30 from being attenuated by the window glass for vehicle 1. Further, as described above, the two glass plates 101 and 102 of the laminated glass 10 to be used may be glass that absorbs ultraviolet rays or infrared rays, which can prevent the inside of the vehicle from becoming too hot.

Further, the strengthened glass 111 has a shape such that the vehicle inner surface of the laminated glass 10 fits on the flush with the vehicle inner surface of the component unit 11, at least in the region, on the boundary between the laminated glass 10 and the component unit 11 (boundary X shown in FIG. 1), where the urethane sealant 50 is applied for attaching the window glass for vehicle 1 to the body panel 60. Note that, in the present specification, two surfaces "fit on the flush with" means that the two surfaces have a deviation of 3.0 mm or less. Further, in the present specification, two faces "have a shape such that they fit on the flush with" means that the two faces have thicknesses that cause the two faces to fit on the flush when the two faces are not curved. When two faces are curved, it means that the two faces have thicknesses and radiuses of curvature that cause the two faces to fit on the flush. The step is thus eliminated between the vehicle inner surface of the laminated glass 10 and the vehicle inner surface of the component unit 11. This can prevent the workability in applying the urethane sealant 50 so as to cover the entire periphery of the window glass for vehicle 1 from being lowered.

The above makes it possible to provide a window glass for vehicle 1 that is easily handled while having a component unit 11 as well as to prevent the intensity of light to be used in the optical equipment, such as a camera 30, attached to a vehicle from being attenuated.

Further, the strengthened glass 111 may have a shape such that the vehicle inner surface and the vehicle outer surface of window glass for vehicle 1 have no step, in the region that is the periphery of the window glass for vehicle 1 and contributes to attaching the window glass for vehicle 1 to the body panel 60. Here, the region that contributes to the attachment of the window glass for vehicle 1 to the body panel 60 is a region where at least the mold 12 and the urethane sealant 50 are provided on the window glass for vehicle 1. Further, in the present specification, a face "has no step" means that the unevenness of the face is 3.0 mm or less. Further, a member "has a shape such that a face has no step" means that the face has a thickness that causes the face to have no step when the member is not curved. When the member is curved, it means the face has a thickness and a radius of curvature that causes the face to have no step. In other words, the combined thickness of the strengthened glass 111 and the shielding layer 113 formed on the vehicle inner surface of the strengthened glass 111 may have the same thickness as the laminated glass 10, in the region that contributes to attaching the window glass for vehicle 1 to the body panel 60. Further, the vehicle outer surface of the strengthened glass 111 may have the same radius of curvature as the vehicle outer surface of the laminated glass 10, and the vehicle inner surface of the shielding layer 113 may have the same radius of curvature as the vehicle inner surface of the laminated glass 10. This makes it possible to attach the window glass for vehicle 1 to the body panel 60 in the same manner as the window glass for vehicle without the component unit 11.

Further, as shown in FIG. 2, the component unit 11 may attach the camera 30 to the vehicle inner side of the window glass for vehicle 1 so that the optical path of the camera 30 (the field of view of the camera 30) is located in the wiper wiping region of the window glass for vehicle 1. Specifically, in the component unit 11, the camera 30 is attached to the camera bracket 114. The camera bracket 114 is attached on the vehicle inner surface of a portion of the strengthened glass 111, which corresponds to the wiper wiping region of the window glass for vehicle 1, by the adhesive 22. Here, the adhesive 22 to be used may be the same adhesive as the adhesive 21. The wiper wipes the vehicle outer surface of the portion of the strengthened glass 111, which corresponds to the optical path of the camera 30. This can prevent the image captured by the camera 30 from being affected by dirt on the vehicle outer surface of the strengthened glass 111.

Further, the strengthened glass 111 may have a shape such that the vehicle outer surface of the laminated glass 10 fits on the flush (are same plane) with the vehicle outer surface of the strengthened glass 111, at the boundary X between the laminated glass 10 and the strengthened glass 111. Specifically, as shown in FIG. 2, the strengthened glass 111 and the laminated glass 10 are joined by the adhesive 21. Therefore, the vehicle outer surface of the laminated glass 10, the vehicle outer surface of the adhesive 21, and the vehicle outer surface of the strengthened glass 111 are preferably fit on the flush. This can prevent the boundary X between the laminated glass 10 and the strengthened glass 111 from affecting the wiping of the wiper when the window glass for vehicle 1 is wiped by the wiper and from causing dirt such as dust on the boundary X to accumulate thereon. Further, the vehicle outer surface of the laminated glass 10, the vehicle outer surface of the adhesive 21, fits on the flush with the vehicle outer surface of the strengthened glass 111. Consequently, the wiper is unlikely to be damaged if the wiper wipes the window glass for vehicle 1 so that the wiper passes through the boundary X.

Further, as shown in FIG. 2, the reinforcing plate 112 may back the vehicle inner surface of the strengthened glass 111 and the vehicle inner surface of the laminated glass 10 at the boundary X between the strengthened glass 111 and the laminated glass 10. In the example shown in FIG. 2, the strengthened glass 111, the laminated glass 10, and the reinforcing plate 112 are joined by an adhesive 21. Specifically, the reinforcing plate 112 is a plate-shaped member having a protrusion linearly protruding from the substantially central portion of the flat plate. Further, the reinforcing plate 112 backs the vehicle inner surface of the strengthened glass 111 and the vehicle inner surface of the laminated glass 10 so that the protrusion is partially inserted between the laminated glass 10 and the strengthened glass 111, which are joined. This can prevent the joint between the strengthened glass 111 and the laminated glass 10 from being impaired if the heavy camera 30 is attached, or the mirror 40 is attached to the strengthened glass 111.

The reinforcing plate 112 may be formed by, for example, injection-molding a resin material containing glass fiber (e.g., a resin material in which 40% of glass fiber (GF) is mixed with polybutylene terephthalate (PBT)).

Further, as shown in FIG. 2, the shielding layer 113 may be further formed on a portion of the vehicle inner surface of the strengthened glass 111, and the portion excludes at least a portion corresponding to the optical path of the camera 30. Specifically, the shielding layer 113 formed on the vehicle inner surface of the strengthened glass 111 may be formed so as to surround the field of view of the camera 30. In the example shown in FIG. 2, the camera bracket 114 is adhered, by the adhesive 22, to the vehicle inner surface of the shielding layer 113 formed on the vehicle inner surface of the strengthened glass 111. Further, the camera cover 115 covers the vehicle inner side of the camera 30. The camera cover 115 may be formed to be detachable from the camera bracket 114. Further, the mirror base 116 is adhered to the upper end side, with respect to the camera bracket 114, of the window glass for vehicle 1 on the vehicle inner surface of the shielding layer 113. A stay of the mirror 40 is adhered to the vehicle inner surface of the mirror base 116. As described above, the shielding layer 113 prevents the portion of adhering the camera bracket 114 to the strengthened glass 111, and the mirror base 116 from being visually recognized from the outside of the vehicle. This makes it possible to improve the design of the window glass for vehicle 1 and the vehicle to which the window glass for vehicle 1 is attached. Note that the method of forming the shielding layer 113 is the same as that of the shielding layer 104, so the description thereof is to be omitted.

The next describes a method of manufacturing the window glass for vehicle 1 according to the first embodiment.

First, a flat plate-shaped vehicle inner glass plate 101 and a vehicle outer glass plate 102 before bending are prepared. Then, in the vehicle inner glass plate 101 and the vehicle outer glass plate 102, the regions where the component unit 11 is arranged are cut-out (step of cutting-out: S11). The method of cutting-out the vehicle inner glass plate 101 and the vehicle outer glass plate 102 can be a known method of cutting-out such as a cutter or a laser.

Next, a ceramic color paste containing a meltable glass frit containing a black pigment is applied to the periphery of the cut-out vehicle inner glass plate 101 and/or the cut-out vehicle outer glass plate 102, and then the paste is dried. After that, the vehicle inner glass plate 101 and the vehicle outer glass plate 102 are heated to the softening point of the glass plate or higher, and then bent. (Step of bending glass: S12). At this time, the ceramic color paste is fired at the same time to form the shielding layer 104. The bent vehicle inner glass plate 101 and the vehicle outer glass plate 102 are slowly cooled. Here, the vehicle inner glass plate 101 and the vehicle outer glass plate 102 may be bent at the same time with two plates being stacked, or the vehicle inner glass plate 101 and the vehicle outer glass plate 102 may be bent separately.

Next, as shown in FIG. 2, the vehicle inner glass plate 101, the interlayer film 103, and the vehicle outer glass plate 102 are laminated so that the interlayer film 103 is interposed between the vehicle inner glass plate 101 and the vehicle outer glass plate 102. Then, the laminated vehicle inner glass plate 101, the interlayer film 103, and the vehicle outer glass plate 102 are heated under reduced pressure to be degassed and preliminarily contact-bonded using a known nip roller, rubber bag, rubber chamber, etc. After the preliminary contact-bonding, in the autoclave the laminate consisting of the vehicle inner glass plate 101, the interlayer film 103, and the vehicle outer glass plate 102 is heated and pressed to be fully contact-bonded, and thereby forms laminated glass (step of forming laminated glass: S13). Here, the shape, thickness, and size of the laminated glass 10 are the same as those of the laminated glass of the window glass for vehicle that is not provided with the component unit 11.

Next, an unstrengthened glass plate that can fit into the cut-out portion of the laminated glass 10 is prepared. A ceramic color paste containing a meltable glass frit containing a black pigment is applied to the unstrengthened glass, dried, and then the unstrengthened glass is heated to a temperature equal to or higher than the softening point of the glass plate, to be bent. At this time, the ceramic color paste is fired at the same time to form the shielding layer 113. When the strengthened glass plate 111 is physically strengthened glass, the glass plate is heated to the softening point or higher, bent, and then rapidly cooled to be air-cooled/tempered, so that a strengthened glass plate 111 is obtained. In addition, when the strengthened glass plate 111 is chemically strengthened glass, the glass plate is heated to the softening point or higher, bent, and then slowly cooled. Then, after the glass plate is slowly cooled, it is chemically strengthened, so that a strengthened glass plate 111 is obtained (strengthened glass forming step: S14).

Next, the reinforcing plate 112 backs the vehicle inner surface of the strengthened glass 111 and the vehicle inner surface of the laminated glass 10. At the same time, the strengthened glass 111 and the laminated glass 10 are joined using the adhesive 21 (step of joining: S15). At this time, the process, in which: the reinforcing plate 112 in a flat plate shape backs the vehicle inner surface of the strengthened glass 111 and the vehicle inner surface of the laminated glass 10; and at the same time the strengthened glass 111 and the laminated glass 10 are adhered, facilitates alignment between the strengthened glass 111 and the laminated glass 10 to be joined.

Next, the camera bracket 114 is adhered to the vehicle inner surface of the shielding layer 113 using the adhesive 22 (step of adhering camera bracket: S16). Here, adhering the camera bracket 114 may use a known double-sided tape, or the adhesive 22 and the double-sided tape in combination. Further, the mirror base 116 is adhered to the vehicle inner surface of the shielding layer 113 (step of adhering mirror base: S17).

Thus, the window glass for vehicle 1 according to the first embodiment can be manufactured. Note that the order of the above steps is not limited to the above order, and may be modified as appropriate.

Second Embodiment

Figure 3:
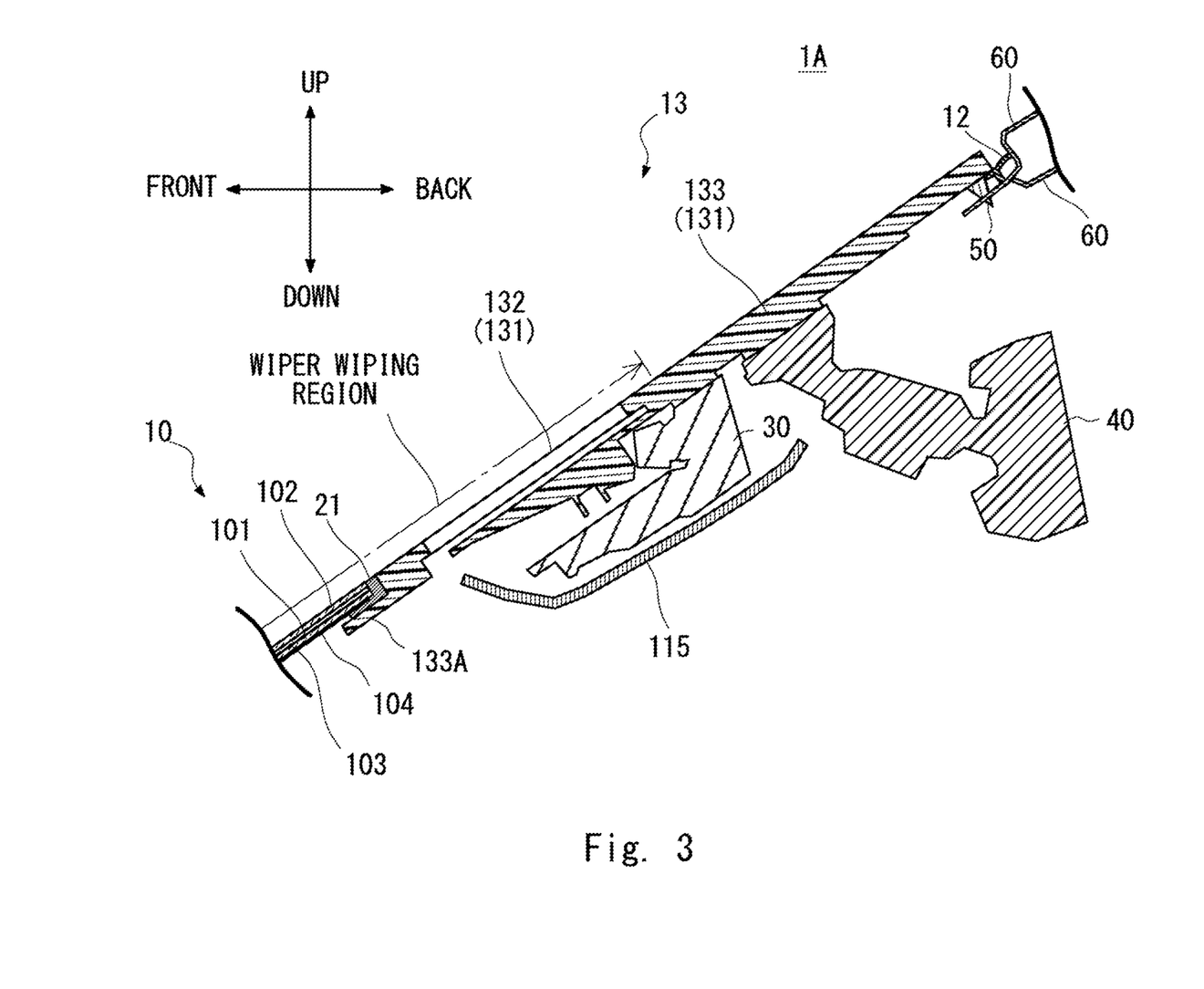
FIG. 3 is a cross-sectional view for explaining a window glass for vehicle according to a second embodiment.

FIG. 3 is a cross-sectional view for explaining a window glass for vehicle 1A according to a second embodiment. FIG. 3 corresponds to a cross-sectional view of the window glass for vehicle 1 cut along a cutting line II-II of FIG. 1, and is a cross-sectional view seen from the left side of the vehicle. The window glass for vehicle 1A according to the second embodiment is different from the window glass for vehicle 1 according to the first embodiment in that the window glass for vehicle 1A includes a component unit 13 instead of the component unit 11. Further, the component unit 13 according to the second embodiment is different from the component unit 11 according to the first embodiment in that the component unit 13 includes the plate-shaped member 131 instead of the strengthened glass 111, the reinforcing plate 112, the shielding layer 113, the camera bracket 114, and the mirror base 116. Therefore, in the following description, of the configurations according to the second embodiment, the same configurations as those of the first embodiment are designated by the same reference numerals and characters, and the description thereof is to be omitted.

The plate-shaped member 131 may include a transmissive unit 132 made of a resin capable of transmitting infrared rays and a shielding unit 133 made of a colored resin. The transmissive unit 132 may occupy at least a portion of the plate-shaped member 131 corresponding to the optical path of the camera 30. The plate-shaped member 131 may have a shape corresponding to the strengthened glass 111, the reinforcing plate 112, the shielding layer 113, the camera bracket 114, and the mirror base 116 of the first embodiment. The plate-shaped member 131 may be formed by integrally forming the transmissive unit 132 and the shielding unit 133 using a forming mold having a shape corresponding to the plate-shaped member 131 (two-color molding). The resin forming the transmissive unit 132 is not particularly limited, but polycarbonate or the like may be used. Further, the resin forming the shielding unit 133 is not particularly limited, but polycarbonate, ABS resin and the like may be used. Using the plate-shaped member 131 including the transmissive unit 132 instead of the strengthened glass 111 makes it possible to further prevent the intensity of the near-infrared rays and far-infrared rays to be used in the camera 30 from being attenuated by the window glass for vehicle 1A.

The plate-shaped member 131 has a shape such that the vehicle inner surface of the laminated glass 10 fits on the flush with the vehicle inner surface of the plate-shaped member 131, at least in the region X, on the boundary X between the laminated glass 10 and the plate-shaped member 131, where the urethane sealant 50 is applied for attaching the window glass for vehicle 1A to the body panel 60. The step is thus eliminated between the vehicle inner surface of the laminated glass 10 and the vehicle inner surface of the plate-shaped member 131. This can prevent the workability in applying the urethane sealant 50 so as to cover the entire periphery of the window glass for vehicle 1A from being lowered.

Further, the plate-shaped member 131 may have a shape such that the vehicle inner surface and the vehicle outer surface of the window glass for vehicle 1A do not have a step in the region that is the periphery of the window glass for vehicle 1A, and that contributes to attaching the window glass for vehicle 1A to the body panel 60. In other words, the plate-shaped member 131 may have the same thickness and radius of curvature as the laminated glass 10 in the region that contributes to attaching the window glass for vehicle 1A to the body panel 60. This makes it possible to attach the window glass for vehicle 1A to the body panel 60 in the same manner as the window glass for vehicle without the component unit 13.

Further, as shown in FIG. 3, the component unit 13 may have the camera 30 attached on the vehicle inner side of the window glass for vehicle 1 so that the optical path of the camera 30 (the field of view of the camera 30) is located in the wiper wiping region of the window glass for vehicle 1A. This allows the vehicle outer surface of the transmissive unit 132 of the plate-shaped member 131 to be wiped by the wiper. This then can prevent the image captured by the camera 30 from being affected by dirt on the vehicle outer surface of the plate-shaped member 131.

Further, the plate-shaped member 131 may have a shape such that the vehicle outer surface of the laminated glass 10 fits on the flush (same plane) with the vehicle outer surface of the plate-shaped member 131 at the boundary X between the laminated glass 10 and the plate-shaped member 131. Specifically, as shown in FIG. 3, the plate-shaped member 131 and the laminated glass 10 are joined by the adhesive 21. So, it is preferable that the vehicle outer surface of the laminated glass 10, the vehicle outer surface of the adhesive 21, fits on the flush with the vehicle outer surface of the plate-shaped member 131. This can prevent the boundary X between the laminated glass 10 and the plate-shaped member 131 from affecting the wiping of the wiper and prevent dirt such as dust from accumulating on the boundary X, when the window glass for vehicle 1A is wiped by the wiper. Further, the vehicle outer surface of the laminated glass 10, the vehicle outer surface of the adhesive 21, fits on the flush with the vehicle outer surface of the plate-shaped member 131. Consequently, the wiper is unlikely to be damaged if the wiper wipes the window glass for vehicle 1 so that it passes through the boundary X.

Further, as shown in FIG. 3, the shielding unit 133 of the plate-shaped member 131 may include an extending portion 133A extending in a plate shape onto the vehicle inner surface of the laminated glass 10 from the boundary X between the plate-shaped member 131 and the laminated glass 10. The extending portion 133A backs the vehicle inner surface of the laminated glass 10. This increases the area to which the adhesive 21 is applied for joining the plate-shaped member 131 and the laminated glass 10. This can prevent the joint between the plate-shaped member 131 and the laminated glass 10 from being impaired if the heavy camera 30 is attached, or the mirror 40 is attached to the plate-shaped member 131.

Further, as shown in FIG. 3, the shielding unit 133 may occupy a portion of the plate-shaped member 131, and the portion excludes at least a portion corresponding to the optical path of the camera 30. In other words, the shielding unit 133 of the plate-shaped member 131 may be formed so as to surround the transmissive unit 132, which is the field of view of the camera 30. In the example shown in FIG. 3, the shielding unit 133 may have a shape corresponding to the camera bracket 114, and the camera cover 115 may be formed so as to be detachable from a portion of the shielding unit 133 corresponding to the camera bracket 114. Further, the shielding unit 133 has a shape corresponding to the mirror base 116, and the stay of the mirror 40 is adhered to a portion of the shielding unit 133 corresponding to the mirror base 116. As described above, the shielding unit 133 prevents the portion of adhering the camera 30 and the stay of the mirror 40 to the plate-shaped member 131 from being visually recognized from the outside of the vehicle. This makes it possible to improve the design of the window glass for vehicle 1A and the vehicle to which the window glass for vehicle 1A is attached.

The next describes a method of manufacturing the window glass for vehicle 1A according to the second embodiment. In the method of manufacturing the window glass for vehicle 1A, the step of cutting-out S21, the step of bending glass S22, and the step of forming laminated glass S23 are the same as the above S11, S12, and S13, so the description thereof is to be omitted.

Next, a plate-shaped member 131 that can fit into the cut-out portion of the laminated glass 10 is prepared (step of forming plate-shaped member: S24). The method of manufacturing the plate-shaped member 131 is described above, so the method thereof is to be omitted.

Next, the plate-shaped member 131 and the laminated glass 10 are joined using the adhesive 21 while the extending portion 133A of the shielding unit 133 backs the vehicle inner surface of the laminated glass 10 (step of joining: S25). At this time, the plate-shaped member 131 and the laminated glass 10 are adhered while the extending portion 133A extending in a flat plate shape backs the vehicle inner surface of the laminated glass 10. This facilitates alignment between the plate-shaped member 131 and the laminated glass 10 to be joined.

Thus, the window glass for vehicle 1A according to the second embodiment can be manufactured. Note that the order of the above steps is not limited to the above order, and may be modified as appropriate.

Modification

The next describes a modification of the window glass for vehicle 1A according to the second embodiment. The window glass for vehicle 1A according to the modification may have a shielding unit 133, of the component unit 13, formed using metal. Using a metal shielding unit 133 instead of the resin shielding unit 133 increases the strength of the component unit 13, and makes it possible to attach vehicle components such as heavier optical equipment to the window glass for vehicle 1A. The metal forming the shielding unit 133 is not particularly limited, but may use a rolled steel sheet provided with electrodeposition coating or the like. Further, the transmissive unit 132 may have a shape such that the vehicle outer surface of the transmissive unit 132 fits on the flush (same plane) with the vehicle outer surface of the shielding unit 133 at the boundary between the transmissive unit 132 and the shielding unit 133. This can prevent the boundary between the transmissive unit 132 and the shielding unit 133 from affecting the wiping of the wiper when the wiper wipes the window glass for vehicle 1A, and prevent dirt such as dust from accumulating on the boundary. Further, the transmissive unit 132 has the boundary between the transmissive unit 132 and the shielding unit 133 at which the vehicle outer surface of the transmissive unit 132 fits on the flush with the vehicle outer surface of the shielding unit 133. Consequently, the wiper is unlikely to be damaged if the wiper wipes the window glass for vehicle 1 so that it passes through the boundary X.

Third Embodiment

Figure 4:
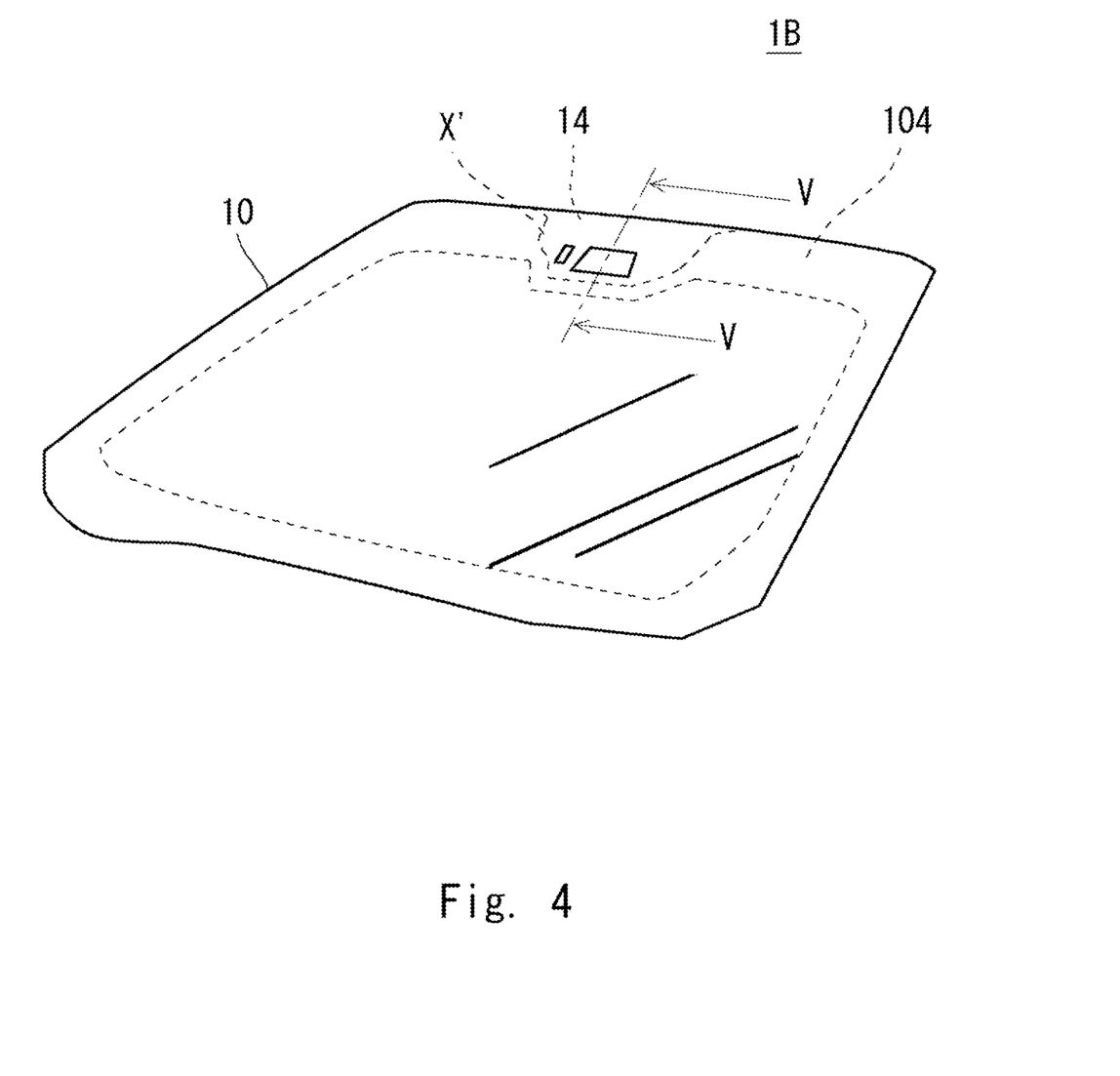
FIG. 4 is a perspective view for explaining a window glass for vehicle according to a third embodiment.
Figure 5:
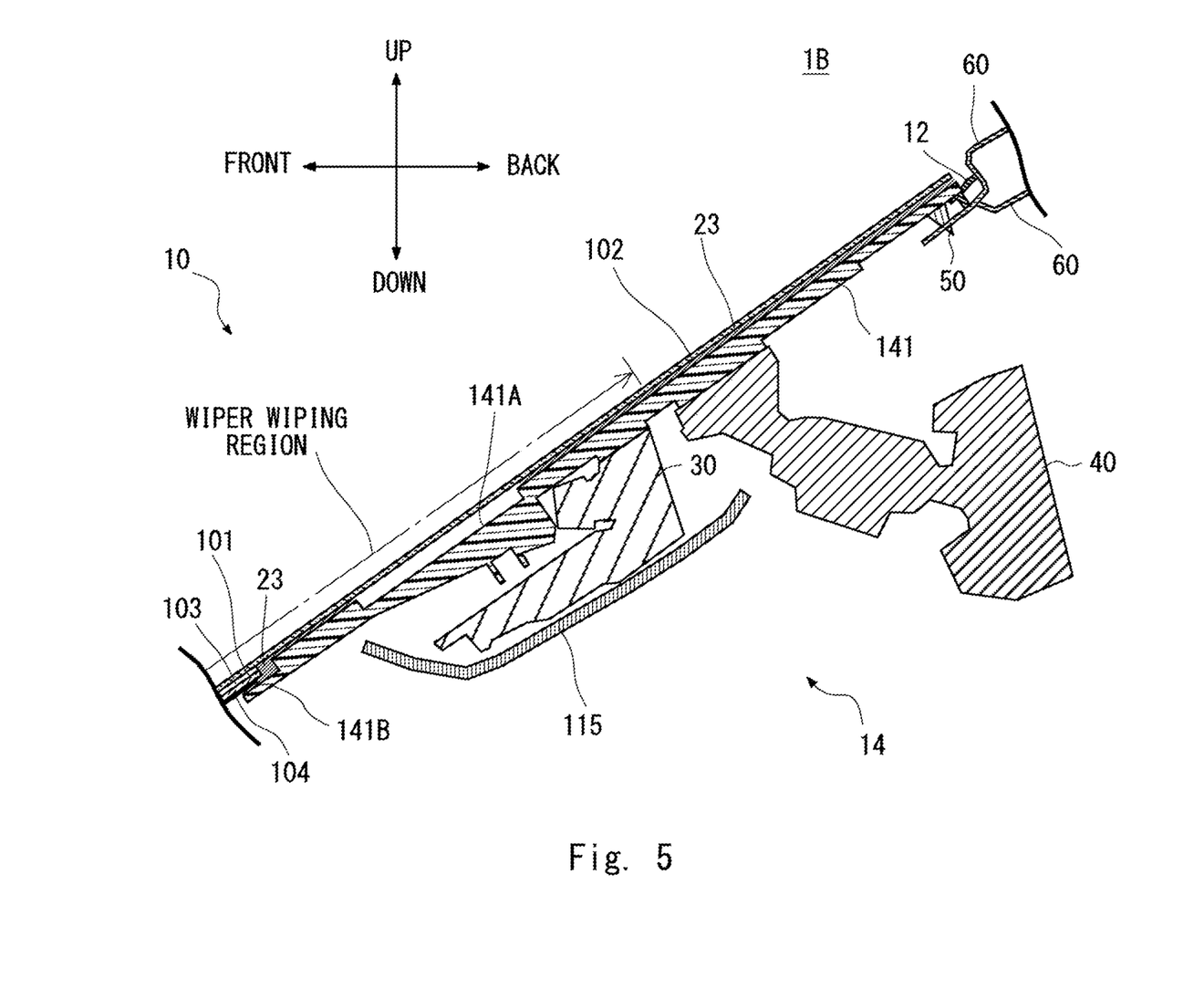
FIG. 5 is a cross-sectional view for explaining the window glass for vehicle according to the third embodiment.

FIG. 4 is a perspective view for explaining the window glass for vehicle 1B according to a third embodiment. FIG. 5 corresponds to a cross-sectional view in which the window glass for vehicle 1B is cut along a cutting line V-V of FIG. 4, and is a cross-sectional view seen from the left side of the vehicle. The third embodiment is different from the first embodiment only in that the vehicle inner glass plate 101 of the laminated glass 10 is cut-out. Further, the window glass for vehicle 1B according to the third embodiment is different from the window glass for vehicle 1 according to the first embodiment in that the former includes the component unit 14 instead of the component unit 11. Further, the component unit 14 according to the third embodiment includes a plate-shaped member 141 instead of the strengthened glass 111, the reinforcing plate 112, the shielding layer 113, the camera bracket 114, and the mirror base 116. In this point, the component unit 14 is different from the component unit 11 according to the first embodiment. Therefore, of the configurations according to the third embodiment in the following description, the same configurations as those of the first embodiment are designated by the same reference numerals and characters, and the description thereof is to be omitted.

The vehicle inner glass plate 101 of the laminated glass 10 may have a cut-out portion, located at the periphery of the laminated glass 10, on which the component unit 14 is arranged. The vehicle outer glass plate 102 of the laminated glass 10 is not cut-out, and this can prevent a step from being formed on the vehicle outer surface of the window glass for vehicle 1B. This can prevent wiping of the wiper from being affected when the wiper wipes the window glass for vehicle 1B.

The plate-shaped member 141 may have a shape corresponding to the strengthened glass 111, the reinforcing plate 112, the shielding layer 113, the camera bracket 114, and the mirror base 116. Further, the plate-shaped member 141 includes an opening 141A that opens at a portion corresponding to the optical path of the camera 30. In other words, the optical path of the camera 30 has only the vehicle outer glass plate 102 of the laminated glass 10 therein except for air. This can prevent the intensity of the near-infrared rays and far-infrared rays to be used in the camera 30 from being attenuated by the window glass for vehicle 1B.

The plate-shaped member 141 has an area that covers a portion of the laminated glass 10 in which the vehicle inner glass plate 101 is cut-out. Further, the plate-shaped member 141 is adhered to the vehicle inner surface of the vehicle outer glass plate 102 of the laminated glass 10 with an adhesive 23. Specifically, in the example shown in FIG. 5, the vehicle outer surface of the plate-shaped member 141 except for the opening 141A is adhered to the vehicle inner surface of the vehicle outer glass plate 102 with the adhesive 23. This can increase the adhering area between the vehicle outer glass plate 102 and the plate-shaped member 141, and can strengthen the adhesion between the laminated glass 10 and the component unit 14. Here, the adhesive 23 to be used may be the same adhesive as the adhesive 21.

The plate-shaped member 141 may be made of colored resin or metal. The colored resin and metal to be used to form the plate-shaped member 141 may be the materials described in the second embodiment.

The plate-shaped member 141 has a shape such that the vehicle inner surface of the laminated glass 10 fits on the flush with the vehicle inner surface of the plate-shaped member 141, at least in the region, on the boundary between the laminated glass 10 and the plate-shaped member 141 (the boundary X' shown in FIG. 4), where the urethane sealant 50 is applied for attaching the window glass for vehicle 1B to the body panel 60. The step is thus eliminated between the vehicle inner surface of the laminated glass 10 and the vehicle inner surface of the plate-shaped member 141. This can prevent the workability in applying the urethane sealant 50 so as to cover the entire periphery of the window glass for vehicle 1B from being lowered.

Further, the plate-shaped member 141 may have a shape such that the vehicle inner surface and the vehicle outer surface of the window glass for vehicle 1B do not have a step in the region that is the periphery of the window glass for vehicle 1B, and that contributes to attaching the window glass for vehicle 1B to the body panel 60. In other words, the combined thickness of the plate-shaped member 141, the vehicle outer glass plate 102, and the adhesive 23 may have the same thickness as the laminated glass 10, in the region that contributes to attaching the window glass for vehicle 1B to the body panel 60. Further, the vehicle inner surface of the plate-shaped member 141 may have the same radius of curvature as the vehicle inner surface of the laminated glass 10 in the region that contributes to attaching the window glass for vehicle 1B to the body panel 60. This makes it possible to attach the window glass for vehicle 1B to the body panel 60 in the same manner as the window glass for vehicle without the component unit 13.

Further, as shown in FIG. 5, the component unit 14 may have the camera 30 attached in the wiper wiping region of the window glass for vehicle 1B. The wiper wipes the vehicle outer surface of the portion of the vehicle outer glass plate 102, which corresponds to the optical path of the camera 30. This can prevent the image captured by the camera 30 from being affected by dirt on the vehicle outer surface of the vehicle outer glass plate 102.

Further, as shown in FIG. 5, the plate-shaped member 141 may include an extending portion 141B extending in a plate shape onto the vehicle inner surface of the laminated glass 10 from the boundary X' between the plate-shaped member 141 and the laminated glass 10. The extending portion 141B backs the vehicle inner surface of the laminated glass 10. This increases the area to which the adhesive 23 is applied for joining the plate-shaped member 141 and the laminated glass 10. This can prevent the joint between the plate-shaped member 141 and the laminated glass 10 from being impaired if the heavy camera 30 is attached, or the mirror 40 is attached to the plate-shaped member 141.

Further, as shown in FIG. 5, the plate-shaped member 141 has a shape corresponding to the camera bracket 114, and the camera cover 115 may be formed so as to be detachable from a portion of the plate-shaped member 141 corresponding to the camera bracket 114. Further, the plate-shaped member 141 has a shape corresponding to the mirror base 116, and the stay of the mirror 40 is adhered to the portion of the plate-shaped member 141 corresponding to the mirror base 116. The plate-shaped member 141 is made of colored resin or metal. Therefore, the plate-shaped member 141 prevents the portion of adhering the camera 30 and the stay of the mirror 40 to the plate-shaped member 141 from being visually recognized from the outside of the vehicle. This makes it possible to improve the design of the window glass for vehicle 1B and the vehicle to which the window glass for vehicle 1B is attached.

The next describes a method of manufacturing the window glass for vehicle 1B according to the third embodiment.

In the method of manufacturing the window glass for vehicle 1B, the step of bending glass S32 and the step of forming laminated glass S33 are the same as the above S12 and S13, so the description thereof is to be omitted.

First, a flat plate-shaped vehicle inner glass plate 101 and a vehicle outer glass plate 102 before bending are prepared. Then, a region, in which the component unit 14 is arranged, in the vehicle inner glass plate 101 is cut-out (step of cutting-out: S31). The method of cutting-out the vehicle inner glass plate 101 can be a known method of cutting-out such as a cutter or a laser, in the same manner as S11. After the step of cutting-out S31, the step of bending glass S32 and the step of forming laminated glass S33 are performed.

Next, a plate-shaped member 141 that can fit into the cut-out portion of the laminated glass 10 is prepared (step of forming plate-shaped member: S34). The plate-shaped member 141 may be formed by filling a forming mold having a shape corresponding to the plate-shaped member 141 with a molten resin material or a molten metal material, and then solidifying the resin material or the metal material.

Next, the extending portion 141B of the plate-shaped member 141 backs the vehicle inner surface of the laminated glass 10, and at the same time the plate-shaped member 141 and the laminated glass 10 are joined with the adhesive 23 (step of joining: S35). At this time, since the plate-shaped member 141 and the laminated glass 10 are adhered while the extending portion 141B extending in a flat plate shape backs the vehicle inner surface of the laminated glass 10, alignment is easier in joining the plate-shaped member 141 and the laminated glass 10.

Thus, the window glass for vehicle 1B according to the third embodiment can be manufactured. Note that the order of the above steps is not limited to the above order, and may be modified as appropriate.

Although the present disclosure is described above in accordance with the above-described embodiments, the present disclosure is not limited to the configurations of the above-described embodiments, and it goes without saying that the present disclosure includes various modifications, alterations, and combinations that can be made by those skilled in the art within the scope of the disclosure claimed in the present application.

The first, second and third embodiments can be combined as desirable by one of ordinary skill in the art.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A window glass for a vehicle, comprising:
a laminated glass comprising (a) an inner glass plate located on an inner side of the vehicle when the laminated glass is attached to the vehicle, (b) an outer glass plate located on an outer side of the vehicle when the laminated glass is attached to the vehicle, and (c) an interlayer film between the inner glass plate and the outer glass plate, the inner glass plate and the outer glass plate being bonded via the interlayer film; and
a component unit comprising an optical component and a plate-shape member, wherein
the laminated glass comprises a cut-out region, where the inner glass plate has a cut-out portion at the periphery of the laminated glass and the outer glass plate is not cut out in the cut-out region of the laminated glass, the component unit is arranged on the inner side of the vehicle when the laminated glass is attached to the vehicle, the plate-shape member covers the cut-out portion of the laminated glass, an optical path of the optical component passes through the cut-region of the laminated glass and the plate-shape member, and
the plate-shape member has a shape at least in a region such that an inner surface of the laminated glass on the inner side of the vehicle when the laminated glass is attached to the vehicle fits flush with an inner surface of the plate-shape member on the inner side of the vehicle when the laminated glass is attached to the vehicle at least in a boundary region on a boundary between the laminated glass and the plate-shape member, the boundary region being a region where an adhesive is applied for attaching the window glass for vehicle to the vehicle.

2. The window glass according to claim 1, wherein the laminated glass comprises a wiper wiping region of the window glass and the cut-out region of the laminated glass is within the wiper wiping region.

3. The window glass according to claim 1, wherein
the plate-shaped member comprises a first portion comprising a resin capable of transmitting infrared rays, the first portion corresponding to the optical path of the optical component.

4. The window glass according to claim 3, wherein the plate-shaped member further comprises a second portion comprising a colored resin, the second portion being other than the first portion.

5. The window glass for vehicle according to claim 3, wherein the plate-shaped member further comprises a second portion comprising a metal, the second portion being other than the first portion.

6. The window glass for vehicle according to claim 5, wherein the first portion has a shape at a boundary with the second portion being such that a vehicle-outer surface of the first portion fits flush with a vehicle outer surface of the second portion.

* * * * *